(12) United States Patent
Davies

(10) Patent No.: US 8,376,899 B2
(45) Date of Patent: Feb. 19, 2013

(54) ROTARY ACTUATOR

(75) Inventor: Stephen Harlow Davies, Shrewsbury (GB)

(73) Assignee: Goodrich Actuation Systems Limited, Solihull (GB)

( * ) Notice: Subject to any disclaimer, the term of this patent is extended or adjusted under 35 U.S.C. 154(b) by 408 days.

(21) Appl. No.: 12/840,614

(22) Filed: Jul. 21, 2010

(65) Prior Publication Data

US 2011/0021307 A1  Jan. 27, 2011

(30) Foreign Application Priority Data

Jul. 24, 2009 (GB) .................... 0912898.4

(51) Int. Cl.
*F16H 3/44* (2006.01)

(52) U.S. Cl. ........................... 475/312; 475/900
(58) Field of Classification Search .............. 475/263, 475/293, 312, 900

See application file for complete search history.

(56) References Cited

U.S. PATENT DOCUMENTS

| | | | | |
|---|---|---|---|---|
| 3,300,001 A | * | 1/1967 | Stockton | .................... 192/219.5 |
| 5,071,397 A | * | 12/1991 | Grimm | ........................ 475/263 |
| 5,353,901 A | | 10/1994 | Jacques et al. | |
| 5,951,433 A | * | 9/1999 | Tsukamoto et al. | .......... 475/281 |
| 6,830,531 B1 | * | 12/2004 | Koenig et al. | ................. 475/263 |
| 7,201,700 B2 | | 4/2007 | Buxton | |

FOREIGN PATENT DOCUMENTS

WO  2005095818  10/2005

OTHER PUBLICATIONS

European Search Report dated Nov. 17, 2010.

* cited by examiner

*Primary Examiner* — Edwin A Young
(74) *Attorney, Agent, or Firm* — Andrus, Sceales, Starke & Sawall, LLP

(57) ABSTRACT

A rotary actuator comprises a planetary gear assembly having a sun gear, a drive input, and a drive transmission whereby rotary device is transmitted between the drive input and the sun gear. The drive transmission incorporates a brake operable to apply a braking load to the sun gear in the event that the torque applied to the drive transmission in at least a first rotary direction exceeds a predetermined level.

12 Claims, 2 Drawing Sheets

ROTARY ACTUATOR

Figure 1:
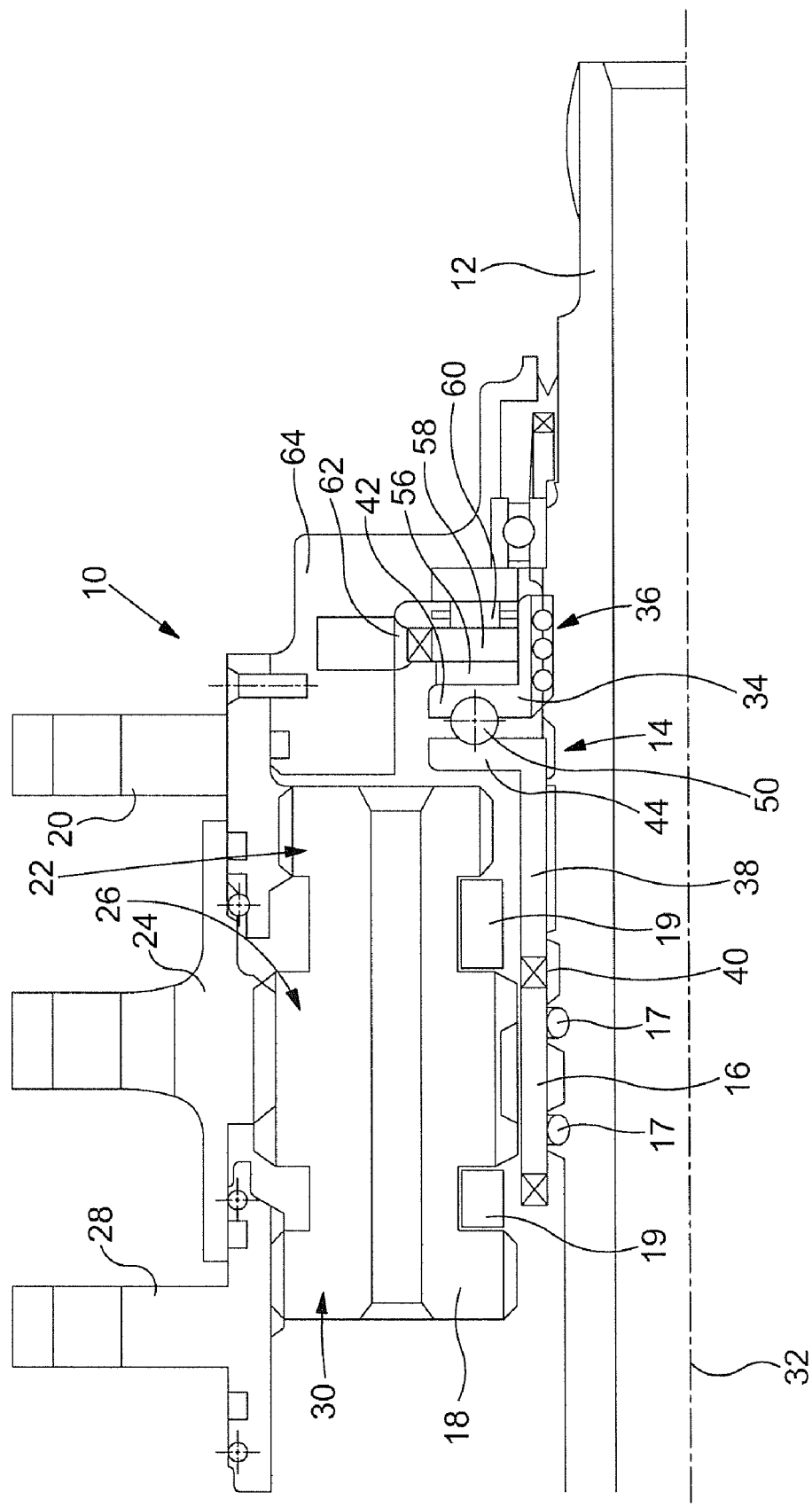

This invention relates to a rotary actuator, and in particular to a geared rotary actuator, for use in driving a movable component for movement relative to another component.

Geared rotary actuators are in widespread use in driving the movable control surfaces, for example the leading edge flaps, associated with an aircraft wing for movement.

A typical geared rotary actuator takes the form of a planetary gear assembly comprising a sun gear arranged to be driven, via a drive shaft, by a separate motor. A series of planet gears surround, and mesh with, the sun gear, each planet gear including a first region meshing with a first outer ring gear and a second region meshing with a second outer ring gear. The first and second regions of the planet gears have different numbers of teeth. The actuator is mounted, in use, with one of the outer ring gears secured to the wing of the aircraft, and so this outer ring gear can be thought of as fixed or earthed. The other outer ring gear is secured to the control surface to be moved. Upon rotation of the motor, the sun gear drives the planet gears for rotation, and the meshing of the planet gears with the earthed ring gear causes the planet gears to precess around the sun gear. The meshing, with a different number of teeth, of the planet gears with the other ring gear drives that ring gear for angular movement at a much slower speed than the rotary speed of the sun gear.

Typically, a third outer ring gear is also provided, the second outer ring gear being sandwiched between the first and third ring gears, and the third ring gear meshing with a third region of each planet gear having the same form as the first region thereof. An arrangement of this type is described in U.S. Pat. No. 7,201,700.

In use, the control surfaces driven by such actuators experience significant aerodynamic loadings which are transmitted through the associated actuators, and it is known to provide the drive shaft or motor with a brake or a so-called no-back device operable to apply a braking load to the drive shaft countering the effects of the externally applied loadings. In the event of, for example, a drive shaft failure, such a brake or no-back device will become ineffective. An alternative approach involves providing each actuator with a separate no-back device.

Such arrangements significantly increase the weight and space requirements of the overall actuator system. There is a move towards reducing wing thickness adjacent the edges of the wings further reducing the space available to accommodate the overall actuator system.

It is an object of the invention to provide a rotary actuator suitable for use in such applications and in which at least some of the disadvantages set out hereinbefore are overcome or are of reduced effect.

According to the present invention there is provided a rotary actuator comprising a planetary gear assembly having a sun gear, a drive input, and a drive transmission arrangement whereby rotary drive is transmitted between the drive input and the sun gear, wherein the drive transmission arrangement incorporates a brake device operable to apply a braking load to the sun gear in the event that the torque applied to the drive transmission arrangement in at least a first rotary direction exceeds a predetermined level.

Such an arrangement has the advantage that it is compact, relatively low in weight, and can still result in the application of a braking load, for example to counter externally applied loads in the event of a drive shaft failure.

The drive transmission arrangement preferably incorporates means for varying the magnitude of the applied braking load depending upon the magnitude of the applied torque. The said means conveniently comprises a ball/ramp or roller/ramp arrangement operable to vary the compression of the brake device.

Conveniently the drive transmission comprises a first component rotatable with the drive input, a second component rotatable with the sun gear, and a ball/ramp or roller/ramp arrangement located therebetween and operable to force the first and second components apart, to increase the compression of the brake device, when the applied torque exceeds the predetermined level.

The brake device preferably incorporates a ratchet device whereby the braking load is only applied in one rotary direction.

Figure 2:
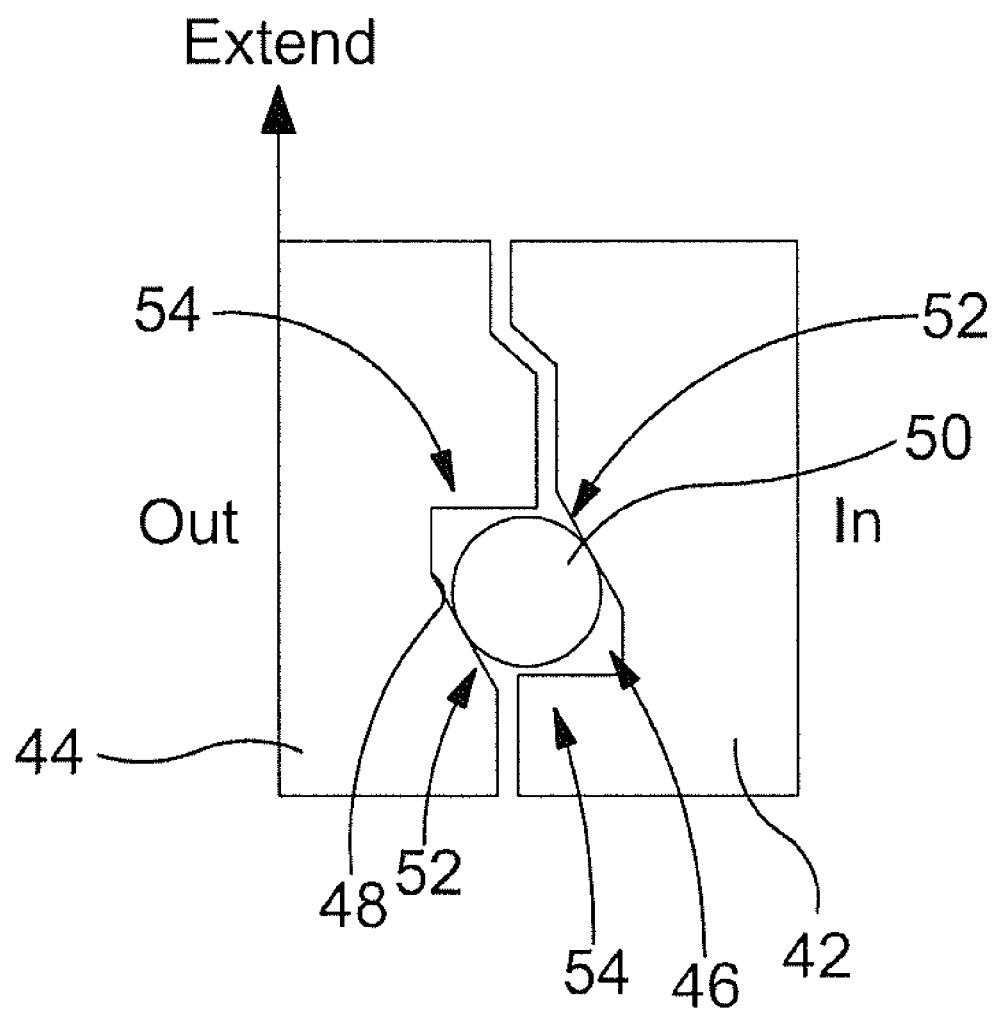

The invention will further be described, by way of example, with reference to the accompanying drawings, in which:

FIG. 1 is a diagrammatic illustration of a rotary actuator in accordance with one embodiment of the invention; and FIG. 2 is a diagrammatic representation of the ball/ramp arrangement of the actuator of FIG. 1.

The rotary actuator illustrated in the accompanying drawings comprises a planetary gear assembly 10 arranged to be driven by a drive input in the form of a drive shaft 12 through the intermediary of a drive transmission arrangement 14.

The planetary gear arrangement 10 comprises an inner sun gear 16 supported by the drive shaft 12 by bearings 17 which allow the drive shaft 12 to rotate independently of the sun gear 16. The sun gear 16 includes teeth meshed with a series of planet gears 18 supported by annular support rings 19. Only one of the planet gears 18 can be seen in FIG. 1. The planetary gear assembly 10 further comprises a first outer ring gear 20 the teeth of which mesh with the teeth of a first region 22 of the planet gears 18. A second ring gear 24 meshes with the teeth of a second region 26 of the planet gears 18, the teeth of the second region 26 of the planet gears 18 also meshing with the sun gear 16 as mentioned hereinbefore. A third ring gear 28 meshes with the teeth of a third region 30 of the planet gears 18.

The first and third regions 22, 30 of the planet gears 18 are substantially identical to one another, including the same number of teeth as one another. The second region 26 has slightly fewer teeth than the first and third regions 22, 30. However, the invention is equally applicable to arrangements in which second region 26 has more teeth than the first and third regions 22, 30.

In use, the first and third ring gears 20, 28 are secured to the wing of an aircraft and so can be thought of as fixed or earthed. The second ring gear 24 is secured to a movable control surface associated with that wing. Upon rotation of the sun gear 16 about its axis 32, the meshing between the sun gear 16 and the planet gears 18 causes the planet gears 18 to rotate. As the planet gears are meshed with the first and third ring gears 20, 28 which are fixed against movement, it will be appreciated that the planet gears 18 are driven in such a manner that they precess about the axis 32. As the second region 26 of the planet gears 18 include a different number of teeth to the first and third regions 22, 30 thereof, the movement of the planet gears 18 drives the second ring gear 24 for angular movement about the axis 32 relative to the first and third ring gears 20, 28 thereby driving the associated control surface for angular movement relative to the wing. The speed of angular movement of the control surface is much slower than the corresponding rotary speed of the sun gear 16.

Typically the sun gear 16 is driven directly from the drive shaft 12. However, in accordance with the present invention a drive transmission arrangement 14 is interposed therebetween. The drive transmission arrangement 14 comprises a first drive component 34 which encircles the drive shaft 12 and is splined thereto by a ball-spline arrangement 36 so as to be rotatable with the drive shaft 12 but capable of undergoing limited axial movement relative thereto. Although a ball-spline arrangement 36 is illustrated, it will be appreciated that another form of splined coupling could be used. A second drive component 38 is coupled to the sun gear 16 by a toothed or castellated coupling 40. It will be appreciated that the coupling 40 serves to transmit drive between the second component 38 and the sun gear 16. The first and second drive components 34, 38 each include a radially outwardly extending flange 42, 44 within which recesses or pockets 46, 48 are formed as best shown in FIG. 2. The recesses 46, 48 are generally aligned with one another, and a ball 50 is located within the aligned recesses 46, 48. Although only a single ball 50 and set of recesses 46, 48 is illustrated, it will be appreciated that several such balls 50 and sets of recesses 46, 48 will be provided around the flanges 42, 44. Further, although balls 50 are shown, rollers could be used instead of the balls if desired.

The recesses 46, 48 are each shaped to include a ramped surface 52 and a steeply inclined surface 54. The orientation of the recesses is such that during normal operation, to drive the control surface from a stowed position to an extended position, the driving load is transmitted through the balls 50 via the steeply inclined surfaces 54. The rotation of the drive shaft 12 is thus transmitted to the sun gear 16 in an efficient manner resulting in the control surface being driven for movement as desired. Once the control surface has commenced movement, there is a tendency for the aerodynamically applied loadings to assist or aid further movement and it is desired that this aiding movement be resisted so as to ensure that movement is controlled. In the event of such aiding movement the sun gear 16 and second component 38 will tend to move, angularly, by a small distance relative to the first component 34, overtaking the movement of the first component as the rotary speed of the first component 34 is governed by the associated motor. In order to accommodate such movement the balls 50 must ride up the ramped surfaces 52, thus forcing the flanges 42, 44 apart.

As best shown in FIG. 1, the flange 42 bears against a brake disc 56 of a material of high coefficient of friction which in turn bears against a ratchet disc 58 supported by a thrust bearing, for example in the form of a roller or needle bearing 60. One or more ratchet pawls 62 pivotally mounted to a housing 64 connected to the first ring gear 20 interact with the ratchet teeth of the ratchet ring 58 so as to permit free rotation of the ratchet ring 58 in one rotary direction and resist reverse rotation of the ratchet ring.

When the drive transmission arrangement 14 operates as described hereinbefore to force the flanges 42, 44 apart it will be appreciated that such movement compresses the brake disc 56 between the flange 42 and the ratchet ring 58, and as the orientation of the ratchet ring 58 and pawl 62 is such that under these circumstances the ratchet ring 58 is unable to rotate, it will be appreciated that a braking load is applied to the sun gear 16. The flange 42, disc 56, ratchet ring 58 and pawl 62 together serve, in this mode of operation as a brake device or no-back resisting the aiding load applied to the control surface. By resisting the aiding load, it will be appreciated that continued rotation of the drive shaft 12 can be used to ensure that the control surface is driven to its desired position in a controlled manner.

In such an arrangement, the magnitude of the braking load applied is dependent upon the degree of compression of the brake disc 56 which in turn is dependent upon the magnitude of the externally applied load.

The orientation of the teeth of the ratchet ring 58 is such that when it is desired to return the control surface to its original position, such movement is not resisted by the no-back or brake arrangement of drive transmission arrangement 14 regardless as to whether or not the flanges 42, 44 are urged apart by the balls 50.

It will be appreciated that the arrangement of the invention is advantageous in that it permits the provision of a brake or no-back device in a manner that is relatively low in weight and is compact. Consequently, packaging of the arrangement on to an aircraft wing is relatively straightforward. It is thought that in the event of a drive shaft failure, there will be sufficient drag within the system that the operation of the ball ramp arrangement will still force the flanges 42, 44 apart and result in the application of a braking load. The arrangement thus serves not only to resist aiding loads but also to guard against undesired movement in the event of a drive shaft failure.

Although only a single actuator is illustrated, it will be appreciated that typically two or more such devices will be used in controlling the operation of each control surface of an aircraft. Further, as described in U.S. Pat. No. 7,201,700, each actuator may be made up of two or more slices, and in such an arrangement drive may be transmitted between the sun gears of the respective slices by the use of a drive linkage coupled to the opposite side of the sun gear 16 from the side to which the second drive component 38 is coupled.

Although the arrangement described hereinbefore incorporates a uni-directional no-back device, it will be appreciated that the arrangement may be modified to incorporate a bi-directional no-back device if desired.

In a modification to the arrangement to the arrangement described a spring or other biasing device may be provided to ensure that some compression of the brake disc 56 is always present. For example a spring or wavy washer may be located behind the surface against which the needle bearings 60 run. Such an arrangement will assist in ensuring that sufficient drag is present to result in the application of a braking load in the event that there is a failure in the drive shaft. It also ensures that during extension of the control surface there is always a minimum frictional load which must be overcome by the motor. By monitoring the operation of the system to ensure that this level of resistance is always present, self-testing of the system can be undertaken.

It will be appreciated that a wide range of modifications and alterations may be made to the arrangement described herein without departing from the scope of the invention.

The invention claimed is:

1. A rotary actuator comprising a planetary gear assembly having a sun gear, a drive input, and a drive transmission arrangement whereby rotary drive is transmitted between the drive input and the sun gear, wherein the drive transmission arrangement incorporates a brake device operable to apply a braking load to the sun gear in the event that the torque applied to the drive transmission arrangement in at least a first rotary direction exceeds a predetermined level.

2. An actuator according to claim 1, wherein the drive transmission arrangement incorporates means for varying the magnitude of the applied braking load depending upon the magnitude of the applied torque.

3. An actuator according to claim 2, wherein the said means comprises a ball/ramp or roller/ramp arrangement operable to vary the compression of the brake device.

4. An actuator according to claim 3, wherein the drive transmission arrangement comprises a first component rotatable with the drive input, a second component rotatable with the sun gear, the ball/ramp or roller/ramp arrangement being located therebetween and operable to force the first and second components apart, to increase the compression of the brake device, when the applied torque exceeds the predetermined level.

5. An actuator according to claim 4, wherein the first component is axially moveable relative to the drive input.

6. An actuator according to claim 5, wherein the first component is coupled to the drive input via a ball spline arrangement.

7. An actuator according to claim 4, wherein the brake device comprises a brake disc with which the first component is cooperable at least when forced apart from the second component.

8. An actuator according to claim 4, wherein the second component is coupled to the sun gear via a toothed or castellated coupling.

9. An actuator according to claim 3, wherein the ball/ramp or roller/ramp arrangement comprises a plurality of recesses, each of which is shaped to include a ramped surface and a steeply inclined surface.

10. An actuator according to claim 1, wherein the brake device incorporates a ratchet device whereby the braking load is only applied in one rotary direction.

11. An actuator according to claim 1, further comprising resilient biasing means arranged to apply a compressive load to the brake device.

12. An actuator according to claim 1, wherein the sun gear is supported by the drive input, bearings being located therebetween.

* * * * *